July 3, 1945.  L. T. FREEMAN ET AL  2,379,796
BRAKE OPERATING MECHANISM
Filed Oct. 1, 1942  3 Sheets-Sheet 1
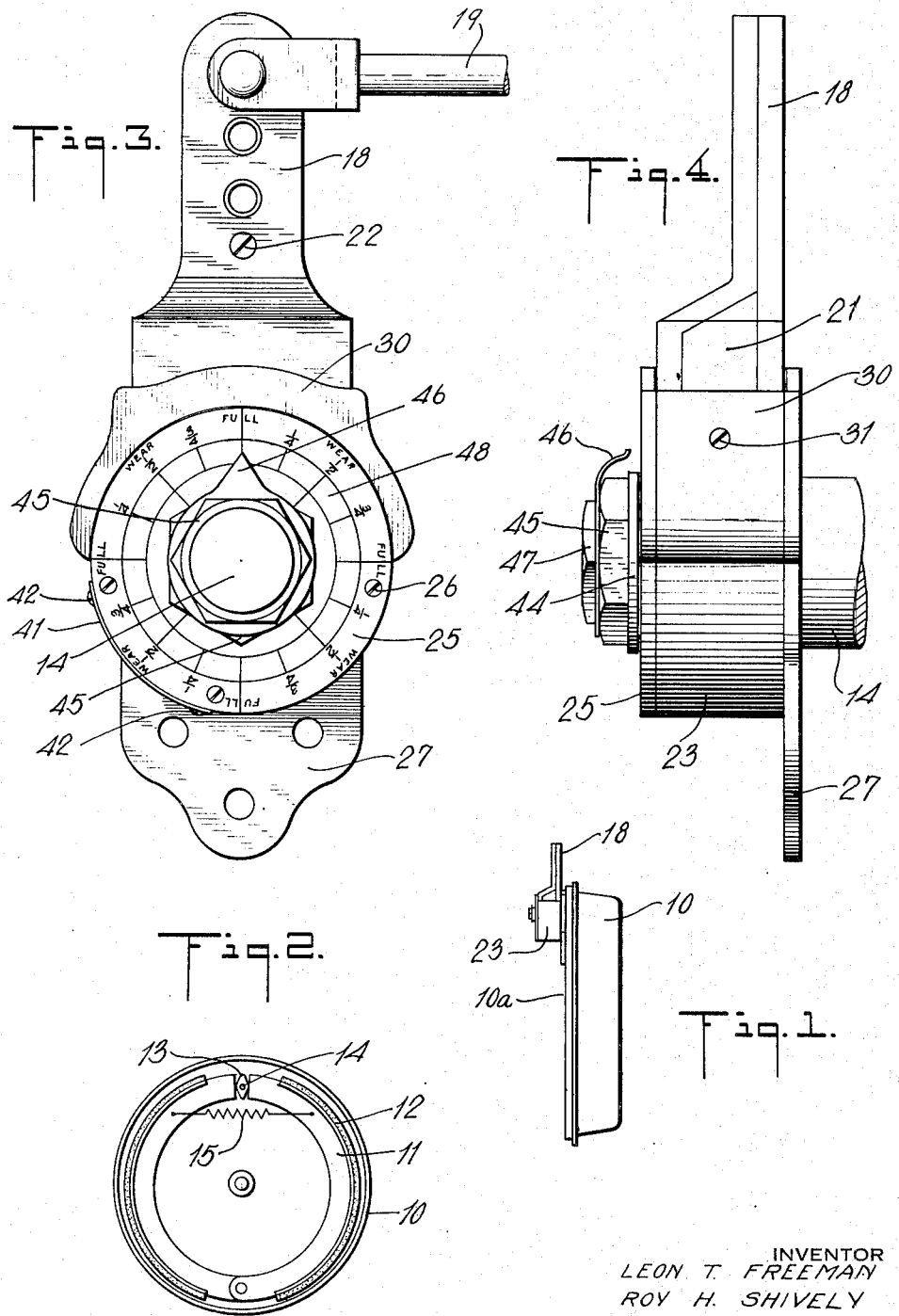
INVENTOR
LEON T. FREEMAN
ROY H. SHIVELY
BY
Emery, Varney, Whittemore & Dix
ATTORNEYS

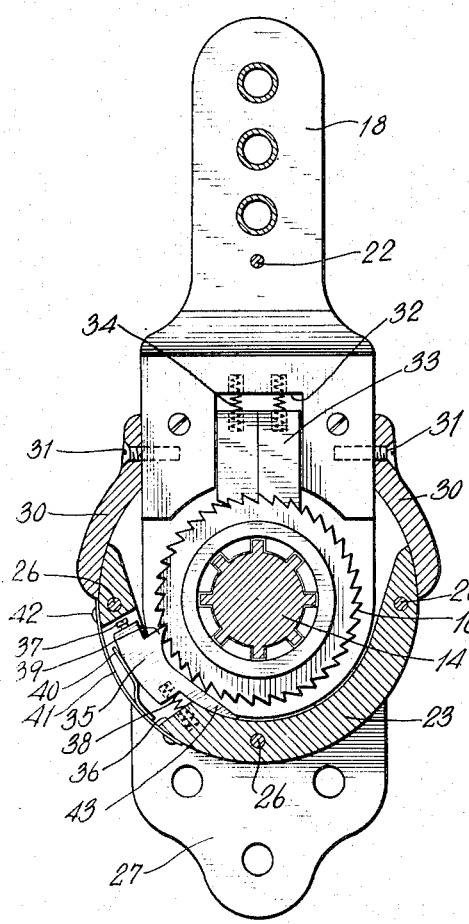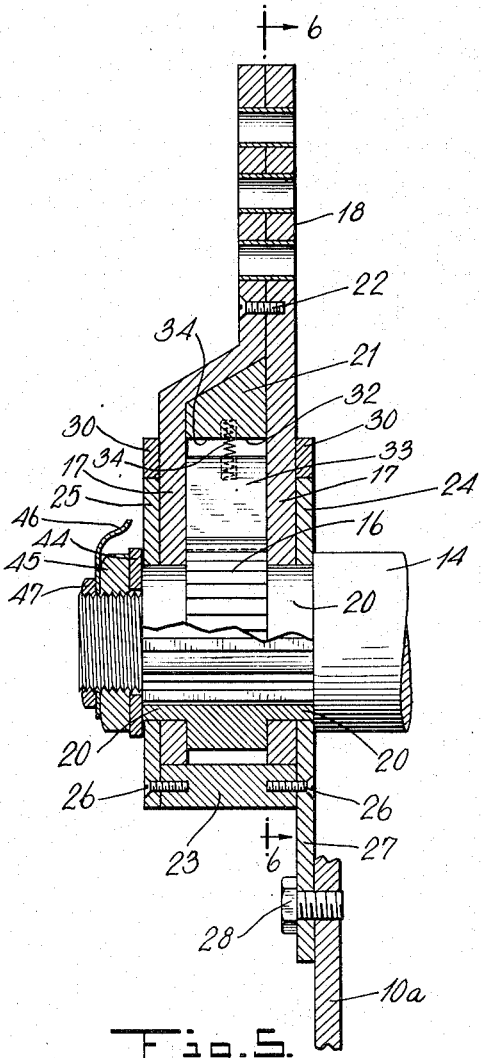

July 3, 1945.  L. T. FREEMAN ET AL  2,379,796
BRAKE OPERATING MECHANISM
Filed Oct. 1, 1942  3 Sheets-Sheet 3
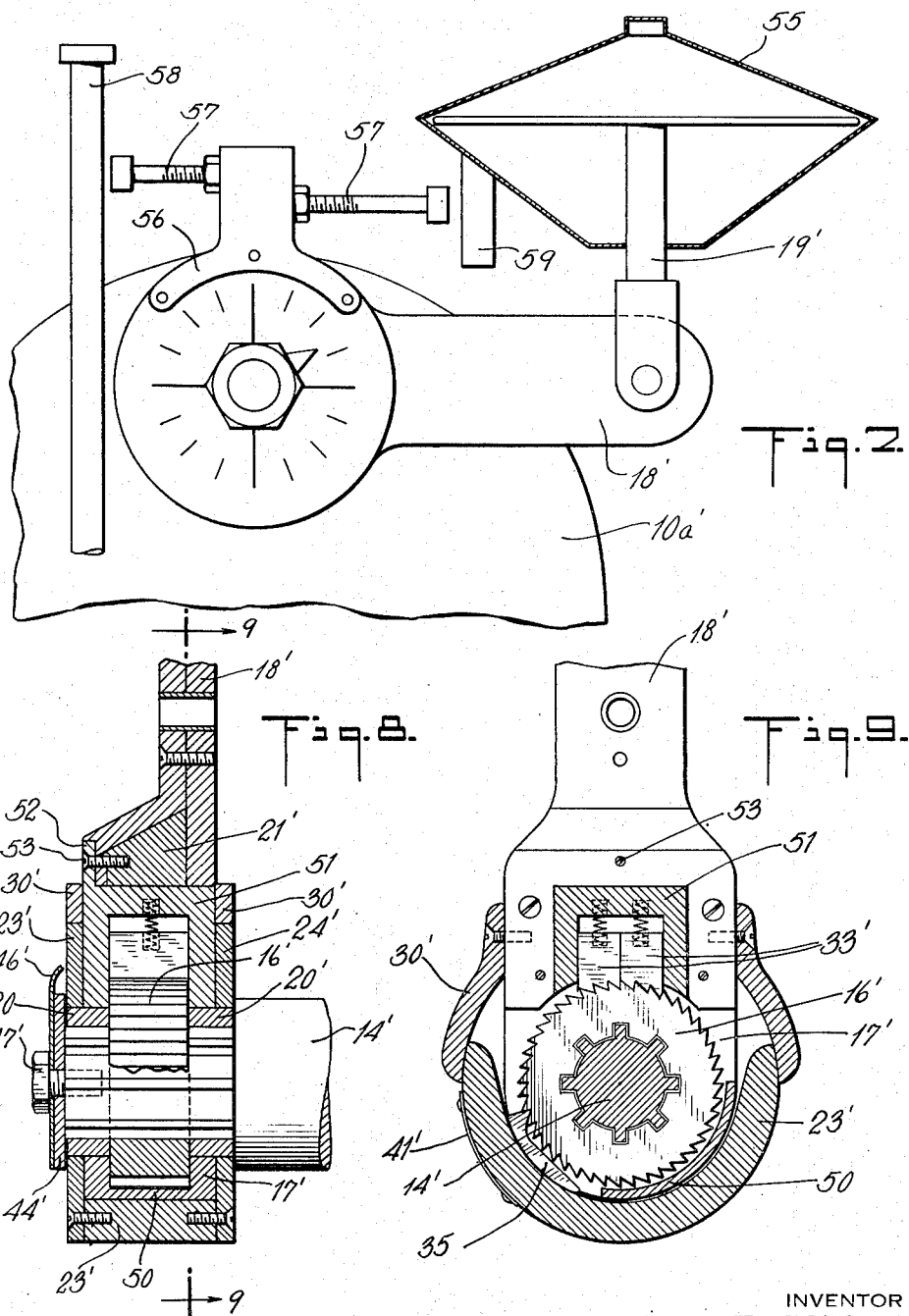
INVENTOR
LEON T. FREEMAN
ROY H. SHIVELY
BY
Emery, Varney, Whittemore & Dix
ATTORNEYS Patented July 3, 1945

2,379,796

UNITED STATES PATENT OFFICE 2,379,796

BRAKE OPERATING MECHANISM

Leon T. Freeman and Roy H. Shively, Scranton, Pa., assignors to Chester H. Shively, Fremont, Ohio Application October 1, 1942, Serial No. 460,336

7 Claims. (Cl. 188—196)

This invention relates to brake operating mechanism and has for an object the provision of improvements in this art.

Among the objects of the invention are the provision of automatic brake adjusting means which can be readily substituted for standard manual brake adjusting means; the provision of brake adjusting means which is readily reversible to replace either right hand or left hand equipment; and the provision of improved details of construction.

The invention will be described by reference to the accompanying drawings, wherein:

Fig. 1 is an edge view of a brake drum cover with the adjusting device of the present invention applied thereto;

Fig. 2 is an interior view showing the brake bands and brake operating cam;

Fig. 3 is an enlarged elevation of the brake adjusting device alone;

Fig. 4 is an edge elevation of the device shown in Fig. 3;

Fig. 5 is a medial vertical section on Fig. 3;

Fig. 6 is a vertical section taken on the line 6—6 of Fig. 5;

Fig. 7 is an inside elevation of a modification;

Fig. 8 is an axial section of the modification; and

Fig. 9 is a section taken on the line 9—9 of Fig. 8.

Referring to Figs. 1 to 6, the standard equipment of a vehicle includes a brake drum 10 and cover 10a, brake shoes or bands 11 with lining 12, a shoe expanding cam 13 provided with a protruding splined cam shaft 14, and a brake release spring 15 acting against the cam. In place of the operating arm which is ordinarily secured to the cam shaft, there is substituted the operating and automatic adjusting device of the present invention.

This device comprises a ratchet gear 16 which is splined interiorly and placed on the splined end of the cam shaft 14. On the sides of the ratchet gear there are disposed the bifurcated ends 17 of an operating arm 18. The outer end of the arm is pivotally connected, in the manner of the usual arm, which it displaces, to a brake operating rod 19.

The inner ends of the arm have circular bearing openings so as be free to turn about the axis of the shaft. In the present embodiment the ratchet gear 16 is provided with annular hub extensions 20 and the openings in the inner ends of the arm have a close turning fit on these extensions. The inner ends of the arm above the ratchet gear are spaced apart by a spacer 21 and are secured together by screws 22. This permits assembly over the hub extensions of the ratchet gear. The outer end of the arm may be aligned with one of its spaced inner ends.

A casing encloses the ratchet gear and the inner ends of the arm, the casing here comprising a bottom shell 23 and end plates 24, 25 which are secured thereto in appropriate manner, as by screws 26. The end plates are circular, at least arcuate on their upper edges, and are provided with circular openings which closely embrace with a turning fit the hub extensions 20 of the ratchet gear.

The inner plate 24, which as adjacent the brake drum, is provided with a projection 27 by which the casing is anchored in a fixed position to the brake drum cover 10a by screws 28. While the casing is here shown to be secured to the brake drum cover, some other fixed support may be employed, such as the axle, frame, or any other convenient part. The support selected will depend upon the type of vehicle being equipped.

A collar 30, provided with an opening to fit closely about the arm when slipped thereon, has an arcuate inner surface which closely fits the outer periphery of the circular casing. The collar tightly seals the space between the arm and the casing throughout all movements of the arm. The collar is secured to the arm, as by screws 31.

The crotch of the arm is provided with an inwardly opening recess 32 housing two slidable actuating pawls 33 and springs 34 for pressing the pawls against the periphery of the ratchet gear. The ends of the springs may be seated in recesses in the pawls and arm if desired. Two or more pawls, when used, insure contact with a sufficient number of teeth to function properly, even though one or two teeth of the ratchet gear or the pawls may be broken. Moreover, one pawl will function even if the other sticks or has its spring broken. There may be six or eight pawls of one tooth each, or a smaller number when each has more than one tooth, and such a plurality of pawls enhances a wide arc and minimizes the tendency to tip.

Means are provided for advancing the ratchet gear 16 one notch or tooth when wear on the brake bands permits the arm 18 to move the pawls through an arc greater than the width of a tooth plus a minimum distance in applying the brakes. The means herein shown comprises an adjustment pawl 35 disposed in an aperture 36 cut in the casing shell 23.

The recess and pawl are of a width equal to the thickness of the ratchet gear in order that the pawl will fit between the ends 17 of the arm 18. The extremities of these arm ends are arcuate so as to fit closely within the arcuate interior surface of the casing shell.

The thickness of the adjustment pawl is such that its rectangular body portion is disposed in the aperture 36. The length of this rectangular body portion is less than the length of the recess, whereby a certain minimum amount of free movement or backlash is provided. This insures that the brake bands will not be locked in braking position after the ratchet gear has been advanced a notch. The amount of free movement permitted the pawl is controlled by the adjustment screws 37 in the end of the pawl. The pawl screws 37 are urged against the end wall of the aperture by a spring 38 disposed between the opposite end of the pawl and aperture. The spring may seat in recesses to keep it in place.

The holding detent or tooth 39 of the pawl is held down by a leaf spring 40 carried on the inner surface of a cover plate 41. The cover plate is secured to the casing shell by screws 42. Both the pawl and the cover plate may be reversed in position when the ratchet gear is reversed to serve either right hand or left hand wheels.

The pawl is provided at the spring end with a tail 43 which is disposed between the outer periphery of the ratchet gear and the inner periphery of the casing. The tail keeps this end of the pawl from rising out of operating position.

The end of the inner hub extension 20 of the ratchet gear fits against a shoulder on the cam shaft 14. A washer 44 and a nut 45 on the reduced outer end of the shaft act against the end of the outer hub extension to secure the ratchet gear on the shaft. A pointer 46 is secured on the shaft by a locknut 47, the pointer cooperating with a scale 48 on the outer end plate 25 of the casing to indicate the adjusted position of the cam. The scale may extend entirely around the circumference of the end plate to provide a plurality of scale units and starting positions.

In Figs. 7, 8 and 9, there is shown a modification in which the extremities of the inner ends 17' of arm 18' are connected together as by a spacer 50, the entire assembly being made permanently integral, as by welding or riveting, if desired. In this case, the ratchet gear 16' is made without hub extensions so that it may be pushed edgewise into the slotted space between the bifurcations of the arm. The elements 20' in this case are merely sleeve spacers extending through the end wall of the casing and the bifurcated arm ends through which the ratchet gear is clamped to the cam shaft 14'.

The actuating pawls 33' may be inserted in a cavity in the crotch of the arms before the gear is slipped in; or may be carried in the recess of a mounting block 51 which is slipped in edgewise like the ratchet gear and then secured by screws as before; or the mounting block 51 may be inserted through a side opening in one of the arms and spacer block 21' and secured by screws 53 through a flange 52 on its outer side.

The adjustment pawl 35 is mounted in the casing shell 23' as before. The arm carries the collar 30' as before.

The parts are secured to the shaft 14' by a washer 44' and a bolt 47' which is threaded into the end of the shaft. The pointer 46' is secured beneath the head of the bolt.

In the modification the arm 18' extends horizontally and the operating rod 19' extends vertically to a fixed diaphragm power device 55. The casing of the adjuster is not mounted on the brake drum cover 10a' but is provided with an extension 56 by which it is adjustably secured between fixed anchorages 58, 59 above the drum by studs 57.

In operation, the arm 18 is moved to the right (Fig. 6) each time the brake rod 19 is operated. Through the operating pawls 33 this turns the ratchet gear 16 clockwise to apply the brakes. The adjustment pawl 35 follows the ratchet gear for a distance and when it stops against the edge of its recess the gear tooth on which it happens to rest at that time will slide beneath it for a distance. Normally the movement is less than the amount required to bring the adjustment pawl over the edge of that tooth and down upon the next tooth; however, when the brake lining becomes sufficiently worn the adjustment pawl will drop down upon the next tooth and limit the return or counter-clockwise movement of the ratchet gear. There is still enough return movement of the adjustment pawl in its recess to permit release of the brakes. Then with the ratchet gear so held, when the arm 18 is released and swings back, the operating pawls 33 slip over the edge to the next tooth position and when the brake mechanism is again operated the brakes will be tightened with a shorter arm stroke than before. This automatic adjustment action is repeated as often as the brake linings wear sufficiently.

While certain exemplary embodiments of the invention have been particularly illustrated and described, it is to be understood that the invention may have various other embodiments within the limits of the prior art and the scope of the subjoined claims.

We claim as our invention:

1. Brake operating mechanism comprising in combination, a cam operating shaft, a ratchet gear secured on said shaft, a fixed cylindrical casing including an arcuate casing shell open at the top and arcuate end plates secured to the shell, an operating arm having bifurcated inner ends mounted to turn about the axis of said shaft, said arm ends being arcuate to fit the interior surface of the shell and said arms filling the space between the sides of the ratchet gear and the end plates of the casing, a spacer closing the space between said arm ends above the ratchet gear, a collar secured to said arm, said collar having an arcuate inner surface closely fitting the outer peripheral surface of the shell and the end plates to maintain a seal in all operating positions of the arm, an operating pawl carried by said arm, and an adjustment pawl carried by said shell.

2. Brake operating mechanism comprising in combination, a cam operating shaft, a ratchet gear secured on said shaft, an operating arm mounted to turn about said shaft, an actuating pawl carried by said arm for turning said gear through an angle, a casing shell enclosing said gear, an aperture through the periphery of said shell, an adjustment pawl in said aperture having a gear-engaging detent at one end and a tail on the other end which extends beyond the edge of the aperture and lies between the outer periphery of the gear and the inner periphery of the shell, a spring urging the pawl toward one end of the aperture and the detent against the side of a gear tooth, adjustable stops to limit the movement of said pawl by said spring and a removable cover plate having a leaf spring pressing the detent end of said pawl against the top of a gear tooth.

3. Brake operating mechanism comprising in combination, a cam operating shaft, a ratchet gear secured on said shaft, an operating arm mounted to turn about said shaft, an actuating pawl carried by said arm for turning said gear through an angle, a casing shell enclosing said gear, an aperture through the periphery of said shell, an adjustment pawl in said aperture having a gear engaging detent at one end, a spring between one end of the adjustment pawl and one end of the aperture urging the pawl toward one end of the aperture and the detent against the side of a gear tooth, adjustable stops between the other end of the adjustment pawl and the other end of the aperture to limit the movement of said pawl by said spring, and a removable cover plate having a spring pressing the detent end of said adjustment pawl against the top of a gear tooth.

4. Brake operating mechanism comprising in combination, a cam operating shaft, a ratchet gear secured to said shaft, a casing surrounding said gear, an operating pawl for said gear, an adjustment pawl for said gear mounted in a recess in said casing, said adjustment pawl having circumferential end play in said recess, an end extension on said adjustment pawl having an arcuate surface operating within an arcuate surface of said casing concentric with said gear, means urging said adjustment pawl in one circumferential direction, and means urging the pawl end opposite said projection against said gear.

5. Brake operating mechanism as set forth in claim 4 in which said means urging the adjustment pawl against the gear is mounted on a removable cover.

6. Brake operating mechanism as set forth in claim 4 wherein adjustment means are provided between the end of adjustment pawl and the end of the recess opposite that at which the circumferential urging means are disposed.

7. Brake operating mechanism, comprising in combination, a cam operating shaft, a ratchet gear secured to said shaft, a fixed casing including an arcuate casing shell open at the top and arcuate end plates secured to the shell, an operating arm having bifurcated inner ends mounted to turn about the axis of said shaft, said arm ends being arcuate to closely fit the interior surface of said shell and said arm ends being disposed to fit closely between the ratchet gear and the end plates of the casing, means on said arm fitting the arcuate upper part of said casing shell and end plates and covering the space on the sides of the bifurcated inner ends of said arms, an operating pawl carried by said arm, an adjustment pawl carried by said shell, and sleeves on each side of the ratchet gear extending through the casing end plates on which the inner ends of said arms are turnably mounted, said gear and sleeves forming spacer means on the cam shaft to prevent binding between shaft and casing.

LEON T. FREEMAN.
ROY H. SHIVELY.